(12) United States Patent
Foote et al.

(10) Patent No.: US 6,213,609 B1
(45) Date of Patent: Apr. 10, 2001

(54) EXTENDABLE AND PIVOTAL REARVIEW MIRROR ASSEMBLY

(75) Inventors: Keith D. Foote, Kentwood; Ian Boddy, Ada; Kenneth C. Peterson, Comstock Park, all of MI (US)

(73) Assignee: Magna Mirror Systems Inc., Kentwood, MI (US)

(*) Notice: Subject to any disclaimer, the term of this patent is extended or adjusted under 35 U.S.C. 154(b) by 0 days.

(21) Appl. No.: 09/545,936

(22) Filed: Apr. 10, 2000

(51) Int. Cl.$^7$ ................................ G02B 5/08; G02B 7/18
(52) U.S. Cl. ..................... 359/841; 359/877; 359/881; 248/900
(58) Field of Search .......................... 359/841, 872, 359/877, 881; 248/480, 900

(56) References Cited

U.S. PATENT DOCUMENTS

| | | |
|---|---|---|
| 4,286,840 | 9/1981 | Covert . |
| 4,907,871 | 3/1990 | Hou . |
| 4,911,545 | 3/1990 | Miller . |
| 4,921,337 | 5/1990 | Hou . |
| 4,936,669 | 6/1990 | Wun . |
| 4,998,812 | 3/1991 | Hou . |
| 5,007,724 | 4/1991 | Hou . |
| 5,483,385 * | 1/1996 | Boddy ................................ 359/841 |
| 5,572,376 | 11/1996 | Pace ................................... 359/877 |
| 5,579,178 | 11/1996 | Mochizuki ........................ 359/841 |
| 5,760,977 | 6/1998 | Leder et al. ....................... 359/841 |
| 5,831,779 | 11/1998 | Moore ................................ 359/841 |
| 5,864,438 | 1/1999 | Pace ................................... 359/841 |
| 5,886,838 | 3/1999 | Kuramoto .......................... 359/841 |
| 6,116,743 * | 9/2000 | Hoek .................................. 359/871 |

\* cited by examiner

Primary Examiner—Cassandra Spyrou
Assistant Examiner—Mark A. Robinson
(74) Attorney, Agent, or Firm—Clark Hill PLC

(57) ABSTRACT

A mirror assembly for use on an automotive vehicle comprises a support base for mounting the mirror assembly to the vehicle. A support arm extends longitudinally between a proximal end pivotally coupled to the support base and an opposite distal end. The mirror assembly further includes a housing coupled to the support arm and slidable between a retracted position adjacent to the proximal end and an extended position adjacent to the distal end and spaced from the proximal end. A glass mirror pane is operatively coupled to the housing for providing a reflective view from the mirror assembly. The mirror assembly also includes a drive mechanism coupled between the support arm and the housing for providing, both power actuated and manual sliding movement of the housing along the support arm between the retracted position and the extended position. The drive mechanism includes a drive screw rotated by a motor for engaging and driving a drive nut coupled to the housing along the longitudinal length of the drive screw. A clutch mechanism allows the drive nut to freely rotate about the drive screw to manually adjust the position of the housing along the support arm. The mirror assembly further includes a pivot mechanism coupled between the support base and the support arm for providing both power actuated and manual pivoting movement of the support arm between an unfolded position extending laterally from the vehicle and a folded position pivoted adjacent and generally parallel to the vehicle.

20 Claims, 6 Drawing Sheets

EXTENDABLE AND PIVOTAL REARVIEW MIRROR ASSEMBLY

BACKGROUND OF THE INVENTION

1. Field of the Invention

The present invention relates generally to a an extendable and pivotal rearview mirror assembly for an automotive vehicle.

2. Description of the Prior Art

Automotive vehicles typically include a pair of exterior rearview mirror assemblies mounted to opposite sides of the vehicle for providing the occupant of the vehicle a rearward reflective view from the vehicle. The mirror assemblies commonly include a base for mounting the mirror assembly to the vehicle. An elongated support arm is commonly coupled to the base and supports a mirror housing or shell. A glass mirror pane is mounted within the housing for providing the reflective view from the vehicle. It is known to pivotally mount the support arm to the base to providing pivotal movement of the housing from an extended, unfolded position, projecting laterally from the vehicle to a folded position collapsed against the side of the vehicle. This pivotal movement of the mirror assembly effectively reduces the overall width of the vehicle and assist in preventing damage to the as mirror assembly caused by impact with external stationary objects. It is also known to provide manual or power operated pivoting movement of the mirror assembly.

It is further desirable and known to provide a mirror assembly that is extendable from a retracted position adjacent the side of the vehicle to an extended position spaced outwardly, or laterally, from the side of the vehicle to increase or expand the field of rearward view from the vehicle. Such mirror assemblies are of ten employed with sport utility vehicles trucks and/or vans to expand the field of view from the vehicle when used for towing. These mirror assemblies typically include a track mechanism Coupled between the housing and the support arm for sliding the housing along the support arm. The mirror assembly may be extended and retracted by manually sliding the housing alone the support arm. Alternatively, a motor and gear drive mechanism may be provided for automatically moving the housing and mirror between the extended and retracted positions.

It remains desirable to provide a mirror assembly that is capable of both manual and power actuation between the extended and retracted positions by a common drive mechanism coupled between the mirror housing and support arm. It is also desirable to provide a mirror assembly that is capable of both manual and power actuation between a folded and unfolded position by a common pivot mechanism. Providing both manual and power actuation of the mirror assembly increases the flexibility of selectively adjusting the mirror assembly between the various positions.

SUMMARY OF THE INVENTION

The present invention relates to a mirror assembly for use on an automotive vehicle comprising a support member extending longitudinally between a first end adapted to be coupled to the vehicle and an opposite second end. The mirror assembly further includes a housing coupled to the support member and slidable between a retracted position adjacent to the first end and an extended position adjacent to the second end and spaced from the first end. A mirror pane is operatively coupled to the housing for providing a reflective view from the mirror assembly. The mirror assembly is characterized by a drive mechanism coupled between the support member and the housing for providing both power actuated and manual sliding movement of the housing along the support arm between the retracted position and the extended position.

The mirror assembly of the present invention also includes a pivot mechanism coupled to the support member for providing both power actuated and manual pivoting movement of the support member between an unfolded position extending laterally from the vehicle and a folded position pivoted adjacent and generally parallel to the vehicle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
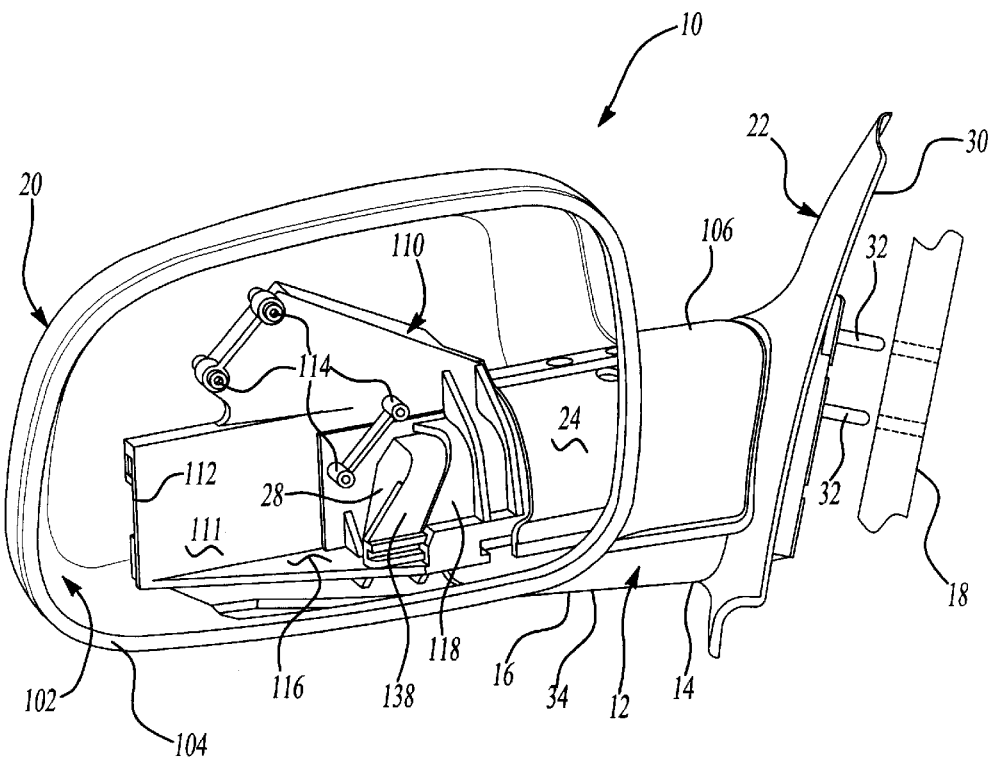
FIG. 1 is a front perspective view of a mirror assembly according to the present invention in a retracted position.
Figure 2:
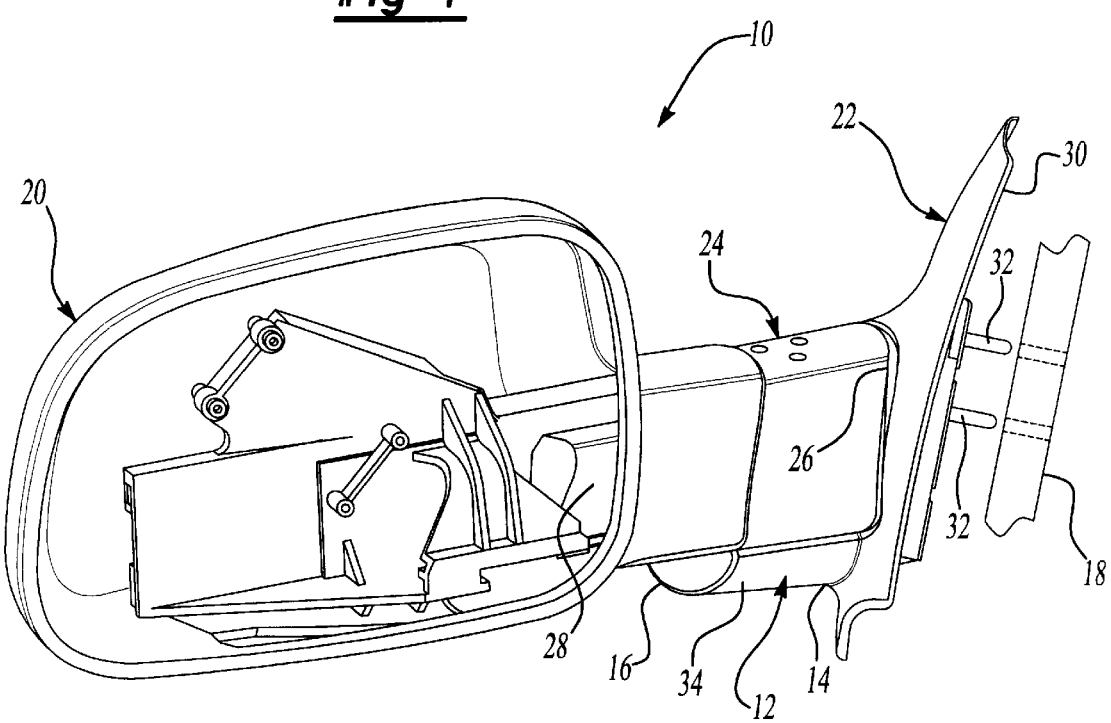
FIG. 2 is a front perspective view of the mirror assembly in an extended position.
Figure 3:
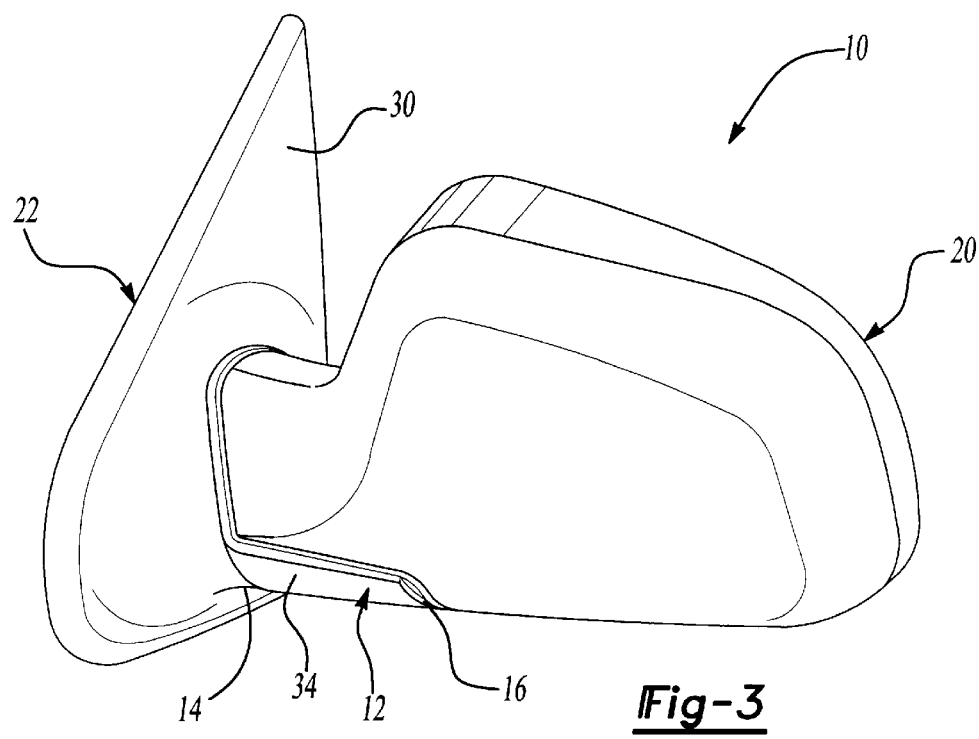
FIG. 3 is a rear perspective view of the mirror assembly in the retracted position.
Figure 4:
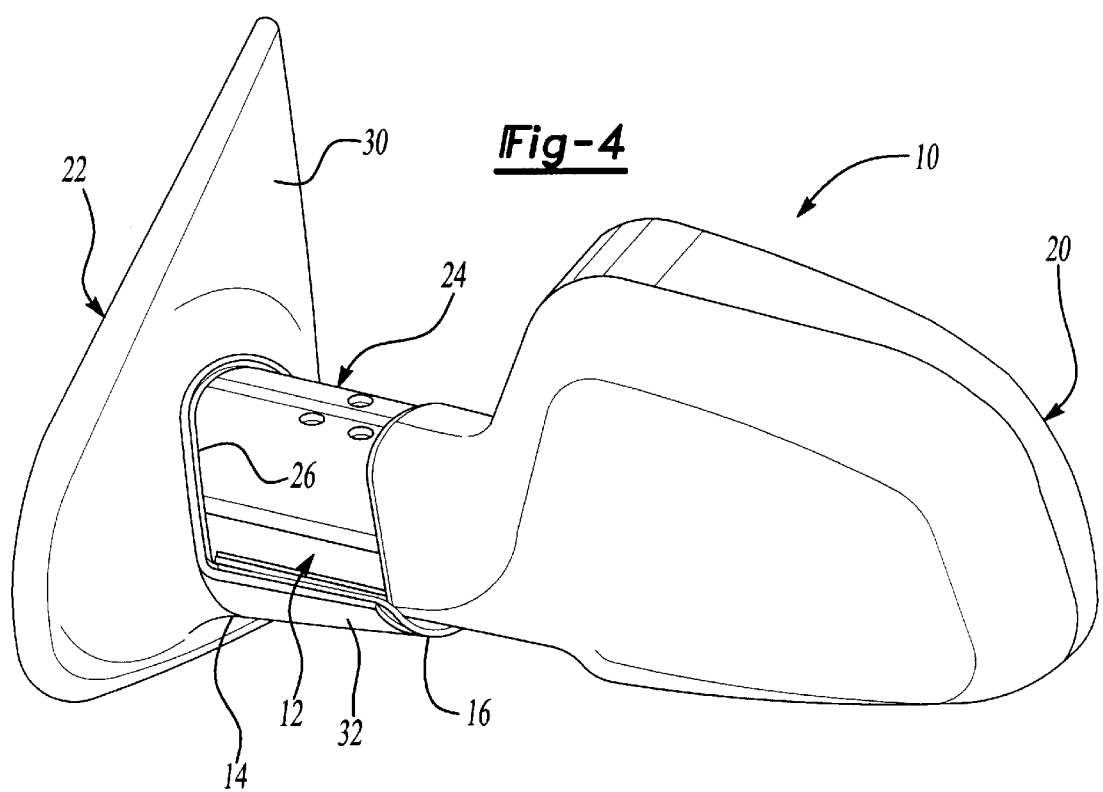
FIG. 4 is a rear perspective view of the mirror assembly in the extended position.

Referring to the Figures, wherein like numerals represent like or corresponding parts throughout the several views, an extendable and pivotal rearview mirror assembly for an automotive vehicle is generally shown at 10 in FIG. 1. The mirror assembly 10 includes a support member 12 extending longitudinally between a first end 14 and a second end 16. The first end 14 is adapted to be coupled to an A-pillar or side door panel of the vehicle as illustrated at 18. The mirror assembly 10 further includes a housing 20 coupled to the support member 12. The housing 20 is slidable along the support member 12 between a retracted position adjacent the first end 14, as shown in FIGS. 1 and 3, and an extended position adjacent the second end 16 and spaced from the first end 14, as shown in FIGS. 2 and 4. Referring specifically to FIGS. 1 and 2, the support member 12 is further defined by including a support base 22 adapted to mount the mirror assembly 10 to the vehicle 18 and an elongated support arm 24 extending between a proximal end 26 and an opposite distal end 28. The support base 22 includes a generally planar mounting plate 30 having a plurality of projecting connectors 32 for fixedly securing the mirror assembly 10 to the side of the vehicle 18. The support base 22 further includes a base plate 34 projecting outwardly from the mounting plate 30. The proximal end 26 of the support arm 24 is pivotally coupled to the base plate 34 for providing pivotal movement of the support arm 24 and housing 20 relative to the support base 22. More specifically, the support arm 24, and thus housing 20, is pivotal about the support base 22 between an unfolded position extending laterally from the mounting plate 30 and the side of the vehicle 18, as shown in FIGS. 1–4, and a pair of folded positions pivoted adjacent and generally parallel to the mounting plate 30 and the side of the vehicle 18, as shown in FIGS. 5 and 6.

Figure 5:
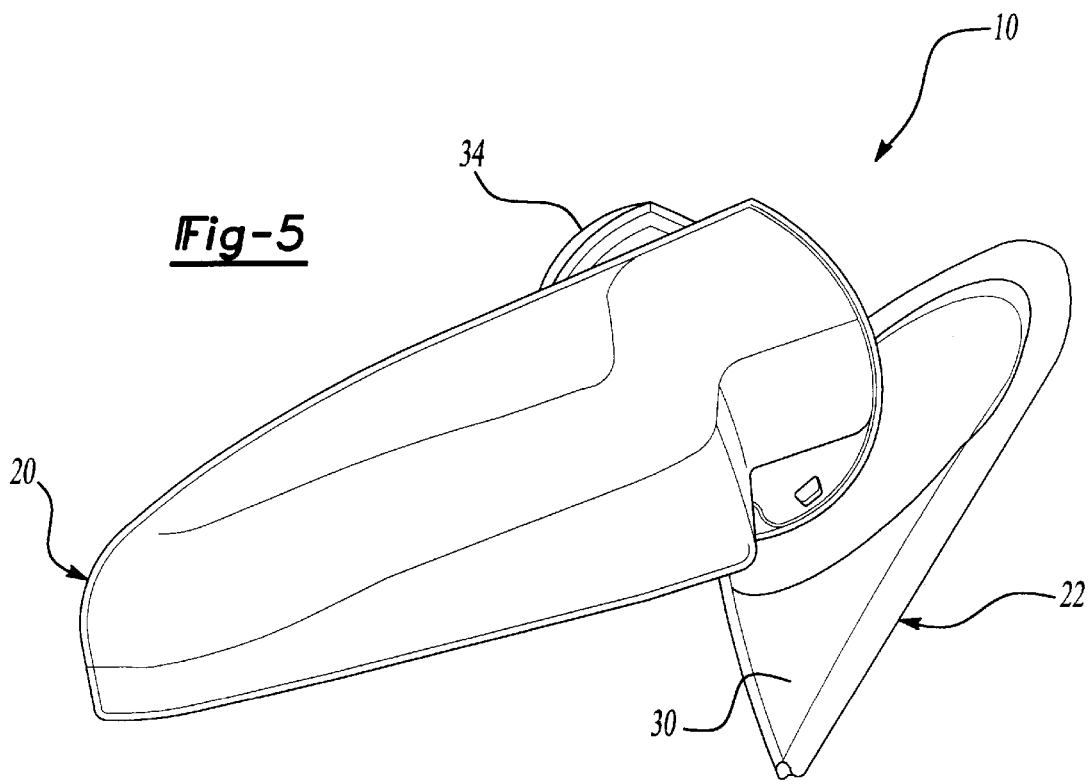
FIG. 5 is a perspective view of the mirror assembly in a rearward folded position.
Figure 6:
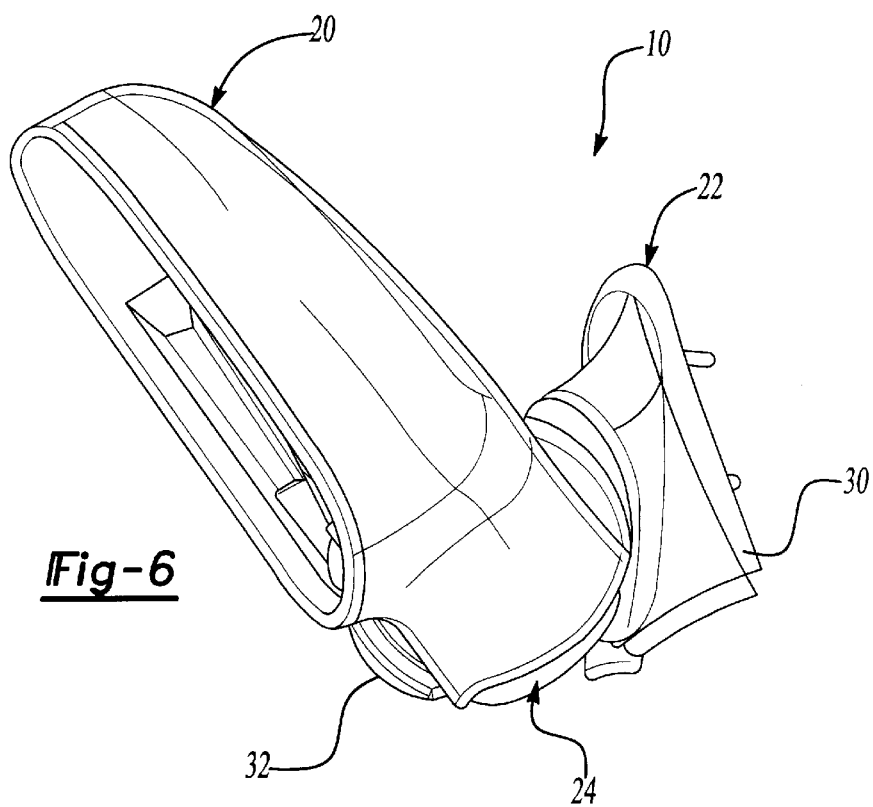
FIG. 6 is a perspective view of the mirror assembly in a forward folded position.

Referring to FIG. 5, the mirror assembly 10 is shown in a rearward folded position wherein the support arm 24 and housing 20 are pivoted counterclockwise about the support base 22 from the unfolded position to a position adjacent to and generally parallel to the mounting plate 30 and the side of the vehicle 18. The rearward folded position of FIG. 5 is further defined by the mirror housing 20 facing toward the rear portion of the vehicle. Referring to FIG. 6, the mirror assembly 10 is shown in a forward folded position wherein the support arm 24 and housing are pivoted clockwise about the support base 22 from the unfolded position to a position adjacent to and generally parallel to the mounting plate 30 and the side of the vehicle 18. The forward folded position of FIG. 6 is further defined by the mirror housing 20 facing toward the front portion of the vehicle. Additionally, it should be appreciated that the mirror assembly 10 may be pivoted from the unfolded position to the forward folded position or rearward folded position while the housing 20 is in the extended position or the retracted position.

Figure 7:
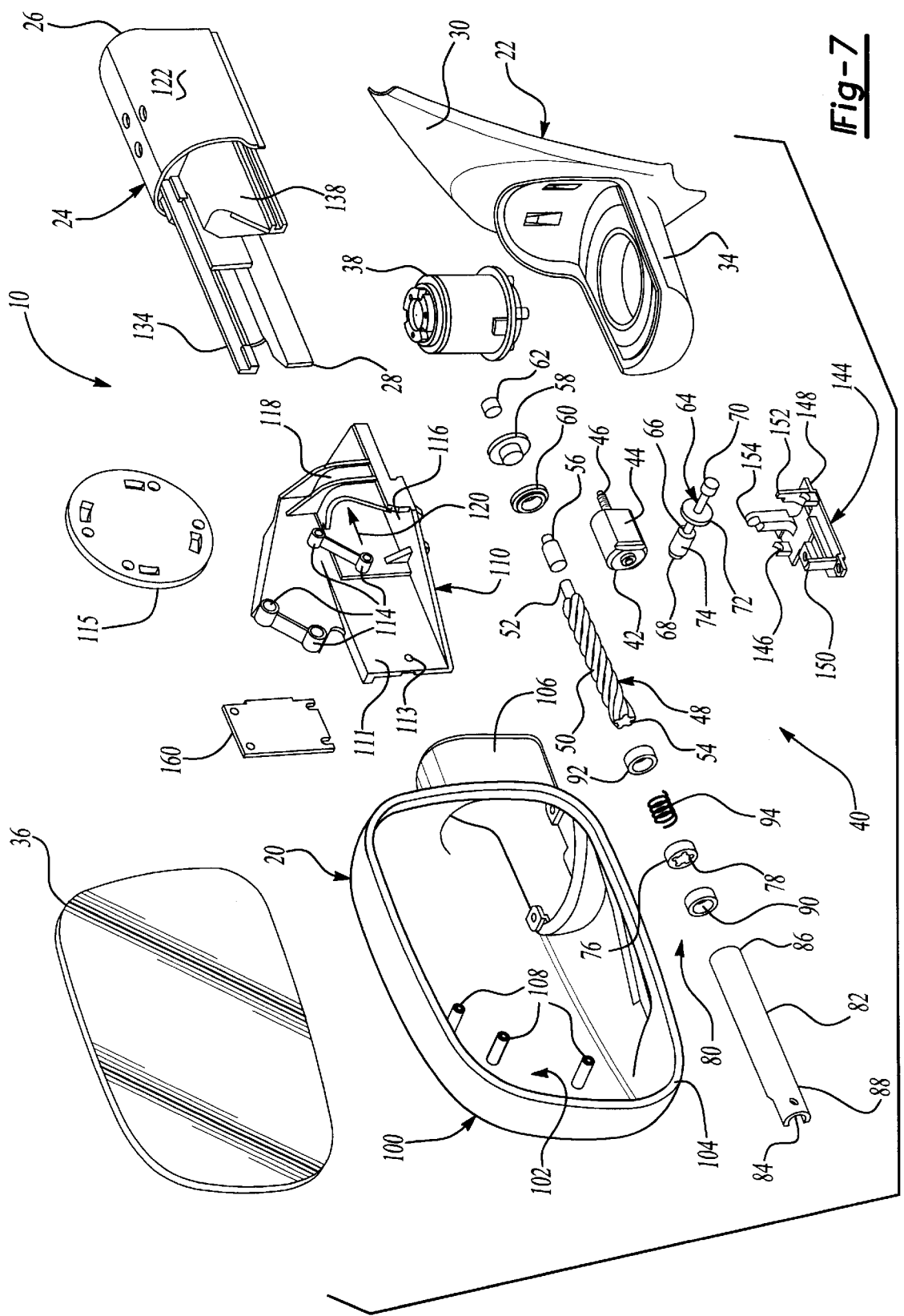
FIG. 7 is an exploded view of the mirror assembly.

Referring now to FIG. 7, an exploded view of the mirror assembly 10 is shown. The mirror assembly 10 includes a mirror pane 36 of planar glass or other reflective material operatively coupled to the housing 20 for providing a reflective view to an occupant of the vehicle from the mirror assembly 10. A pivot mechanism 38 is mounted between the support base 22 and the proximal end 26 of the support arm 24 for pivoting the support arm 24 about the support base 22 between the unfolded position and the folded positions. More specifically, the pivot mechanism 38 is fixedly secured between the mounting plate 34 of the support base 22 and the support arm 24 and provides both power actuated and manual pivoting movement of the support arm 24 between the unfolded position and the folded positions. Further operation and detailed description of the pivot mechanism 38 are fully set forth in applicant's U.S. Pat. Nos. 5,703,731; 5,703,732 and 5,684,646, which are incorporated by reference, in their entirety, herein.

The mirror assembly 10 is characterized by including a drive mechanism 40 coupled between the support arm 24 and the housing 20 for providing both power actuated and manual sliding movement of the housing 20 along the support arm 24 between the retracted position and the extended position. The drive mechanism 40 includes an electrically power motor 42 coupled to the support arm 24 for selectively actuating the drive mechanism 40. The drive mechanism 40 automatically slides the housing 20 along the support arm 24 to a power selected position between the retracted position and the extended position. The power selected position is further defined by any longitudinal position of the housing 20 relative to and along the support arm 24 between and including the retracted position and the extended position, such as shown in FIGS. 1 and 2. The motor 42 includes a power box 44 for driving and rotating a drive shaft and worm gear 46 in either the clockwise or counterclockwise direction. The motor 42 may be powered via an electrical connection with the power supply of the vehicle and controlled by a control switch, as is commonly known in the art.

The drive mechanism 40 further includes an elongated, cylindrical drive screw 48 having external helical threads 50. The drive screw 48 extends longitudinally between a first end 52 operatively coupled to the support arm 24 and a second end 54 operatively coupled to the housing 20. A cylindrical connecting shaft 56 in connected to the first end 52 of the drive screw 48 for supporting a drive gear 58 having external gear teeth thereon. A pair of bushings 60, 62 are further supported on the connecting shaft 56 along opposing sides of the drive gear 58 for providing rotational support of the first end 52 of the drive screw 48 with the support arm 24. An intermediate gear assembly 64 interconnects the drive gear 58 and the worn gear 46 of the motor 42. Specifically, the intermediate gear assembly 64 includes an elongated cylindrical shaft 66 rotatably supported by bushings 68, 70 at opposite ends thereof to the support arm 22. The shaft 66 and extends transverse to the first end 52 of the drive screw 48. A toothed disc-shaped gear 72 is fixed to the shaft 66 between the bushings 68, 70 for engagement with the worm gear 46 on the motor 42. A spiral toothed worm gear 74 is also fixed to the shaft 66 adjacent the bushing 68 and spaced from the disc-shaped gear 72 for engagement with the drive gear 58 on the drive screw 48. The drive mechanism 40 further includes a drive nut 76 having internal helical threads 78 in mating engagement with the threads 50 of the drive screw 48 for movement therealong between the first end 52 and the second end 54. It should be appreciated that the drive screw 48 may alternatively include a toothed rack engaged with a tooth gear or pawl rather than the threaded drive nut 76 without varying from the scope of the invention.

The drive mechanism 40 includes a clutch mechanism 80 coupled to either the housing 20 or the support arm 24 for selectively actuating the drive mechanism 40 to manually slide the housing 20 along the support arm 24 to a manual selected position between the retracted position and the extended position. The manual selected position is further defined as any longitudinal position of the housing 20 along the support arm 24 between and including the retracted position and the extended position, as shown in FIGS. 1 and 2. However, the manual selected position is selectively actuated by applying a force against the housing 20 to manually slide the housing 20 along the Support arm 24, as will be further described hereinbelow. The drive mechanism 40 further includes an elongated tube 82 defining a cylindrical bore 84 therethrough. The tube 82 has a first end 86 for receiving the second end 54 of the drive screw 48 within the bore 84 and a second end 88 coupled to the housing 20. A pair of retaining rings 90, 92 forming through-holes for receiving the drive screw 48 therethrough are fixedly secured within the bore 84 between the ends 86, 88 of the tube. The retaining rings 90, 92 are spaced apart along opposing sides of the drive nut 76 to retain the drive nut 76 therebetween on the threads of the drive screw 48.

The clutch mechanism 80 further includes a spring bias member 94, such as a coil spring, supported around the drive screw 48 and compressed between the drive nut 76 and the retaining ring 92 within the bore 84 of the tube 82. It should be appreciated that the spring 94 could alternatively be compressed between the drive nut 76 and the other retaining ring 90. The spring bias member 94 forces the drive nut 76 to engage and interlock with the opposite retaining ring 90, and thus tube 82, upon rotation of the drive screw 48, thereby forcing the housing 20 to slide along the support arm 24 to the power selected position in response to power actuation of the motor 42. The spring bias member 94, however, also allows the drive nut 76 to rotate about the drive screw 48 upon manual sliding adjustment, or movement. of the housing 20 along the support arm 24 to the manual selected position. Alternatively, the spring bias member 94 may be compressed between the drive gear 58 and the motor 42 for interlocking the drive screw 48, drive gear 58 and motor 42 during power actuation and for disengaging the drive screw 48 and drive gear 58 from the motor 42 during manual actuation. It should also be appreciated that the spring 94 may alternatively include a disc plate frictionally or lockingly engagable between the drive screw 48 and drive nut 76 or motor 42 without varying from the scope of the invention.

Still referring to FIG. 7, the housing 20 of the mirror assembly 10 further includes a concave outer wall 100 defining a bowl-shaped cavity 102 and terminating at a peripheral rim 104 defining an opening into the cavity 102. The housing 20 also includes a hollow tube arm 106 extending from the outer wall 100 and opening into the cavity 102 for slidably receiving the distal end 28 of the support arm 24. The outer wall 100 includes a plurality of outwardly projecting mounting bosses 108 extending into the cavity 102. The mirror assembly 10 additionally includes a support bracket 110 seated within the cavity 102 and fixedly mounted, by screw or other fasteners, to the bosses 108 on the outer wall 100. As shown in FIG. 1, the support bracket 110 includes a planar front plate 111 spaced from the surface of the outer wall 100 by the bosses 108 defining a channel 112 therebetween for slidably receiving at least a portion of the distal end 28 of the support arm 24. The second end 88 of the tube 82 is fixedly secured to the front plate 111 by a screw or fastener at 113 for securely mounting the tube 82 to the housing 20. The support bracket 110 also includes a plurality of bosses 114 projecting outwardly from the front plate 111 toward the opening formed by the peripheral rim 104 of the housing 20. A power pack 115 is fixedly secured to the bosses 114 on the support bracket 110. The mirror pane 36 is mounted and supported on the power pack 115 and seated between the peripheral rim 104 forming the opening in the housing 20. The power pack 115 provides pivotal articulation of the mirror pane 36 relative to the housing 20 for adjusting the reflective view to the occupant of the vehicle as is commonly known in the art. The power pack 115 nay be power actuated or manually actuated. Further description and operation of the power pack 115 is fully set forth in applicant's U.S. Pat. No. 5,467,230, which is incorporated by reference, in its entirety, herein.

The support bracket 110 further includes a bottom plate 116 extending outwardly from the front plate 111 and generally perpendicular thereto. An L-shaped tunnel wall 118 interconnects a portion of the front plate 111 and a portion of the bottom plate 116 forming a tunnel opening 120 therethrough for slidably receiving a portion of the distal end 28 of the Support arm 24.

Figure 8:
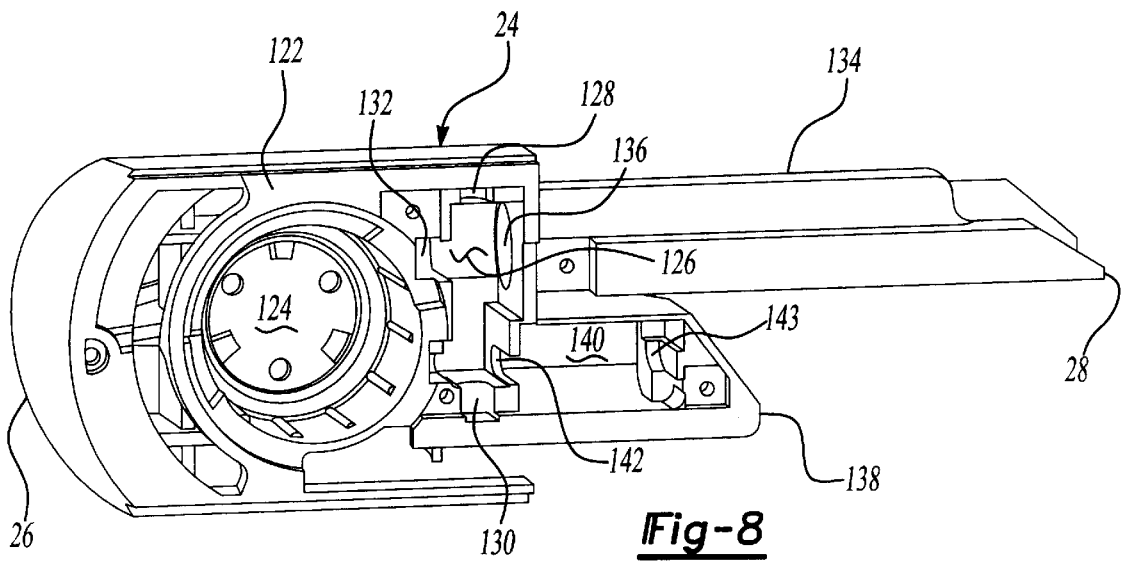
FIG. 8 is a bottom perspective view of a support arm of the mirror assembly.

Referring to FIGS. 7 and 8, the support arm 24 includes a pivot base portion 122 adjacent the proximal end 26 defining a cylindrical cavity 124 for receiving and mounting the pivot mechanism 38 therein. That is, the pivot mechanism 38 is recessed with the cavity 124 and mounted between the pivot base portion 122 of the Support arm 24 and the base plate 34 of the support base 22. The pivot base portion 122 also defines a recessed chamber 126 for receiving and supporting the drive gear 58 and the intermediate gear assembly 64. The recess chamber 126 includes a pair of U-shaped shelves 128, 130 integrally formed therein for supporting the respective bushings 68, 70 of the intermediate gear assembly 64 and a U-shaped shelf 132 for supporting the bushing 62 of the drive gear 58. The support arm 24 further includes an extension leg portion 134 extending from the pivot base portion 122 to the distal end 28 defining a cylindrical bore 136 therethrough. The bore 136 extends from the recessed chamber 126 to the distal end 28 of the support arm 24 for receiving the drive screw 48 longitudinally therethrough. The extension leg portion 134 is slidably received within the channel 112 between the outer wall 100 of the housing 20 and the front plate 111 of the support bracket 110. The support arm 24 also includes an extension post portion 138 extending from the pivot base portion 122 adjacent and parallel to the extension leg portion 134. The post portion 138 defines a recessed channel 140 therein for receiving and supporting the motor 42. The recessed channel 140 includes a pair of U-shaped shelves 142, 143 integrally formed therein for supporting the power box 44 and the drive shaft and worm gear 46 of the motor 42. The extension post portion 138 is slidably received within the tunnel opening 120 formed by the tunnel wall 118 of the support bracket 110 as shown in FIGS. 1 and 2.

The mirror assembly 10 additionally includes a cover plate 144 fixedly secured to the support arm 24 for covering and closing the recessed chamber 126 and the recess channel 140. The cover plate 144 is fixedly attached to the bottom of the support arm 24 by screws or fasteners. The cover plate 144 includes a first pair of spaced apart finger couplings 146, 148 for supporting the respective bushings 68, 70 of the intermediate gear assembly 64 against the shelves 128, 130. The cover plate 144 also includes a second pair of spaced apart finger couplings 150, 152 for supporting the power box 44 and the drive shaft and worm gear 46 of the motor 42 against the shelves 142, 143. The cover plate 144 still includes a coupler post 154 for rotatably coupling and supporting the bushing 62 of the drive screw 48 against the shelf 132.

Finally, the mirror assembly 10 includes a retaining member 160 coupled between the support arm 24 and the housing 20 for retaining the housing 20 along the support arm 24 in each of the power selected position and the manual selected position. More specifically, the retaining member 160 is a plate secured to the front plate 111 of the support bracket 110 and frictionally engaged with the extension leg portion 134 of the support arm 24. The retaining member 160 is spring bias, similar to a torsion spring, against the leg portion 134 of the support arm 24 to provide sufficient frictional resistance thereagainst to retain the housing 20 in a selected position between the retracted position and the extended position. The retaining member 160 may alternatively include a leaf spring, coil spring, detent tab or other member engaged between any portion of the housing 20 and any portion of the support arm 24 for retaining the housing 20 along the support arm 24 between the extended position and the retracted position.

Figure 9:
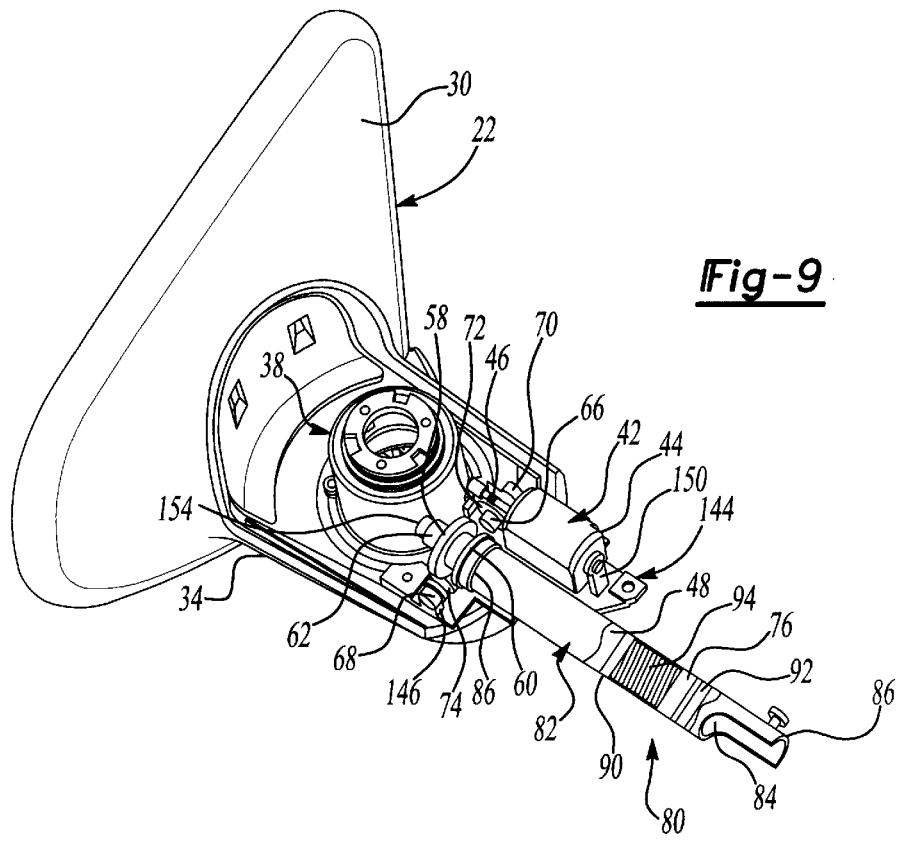
FIG. 9 is partially broken perspective view of a drive mechanism of the mirror assembly in the retracted position.
Figure 10:
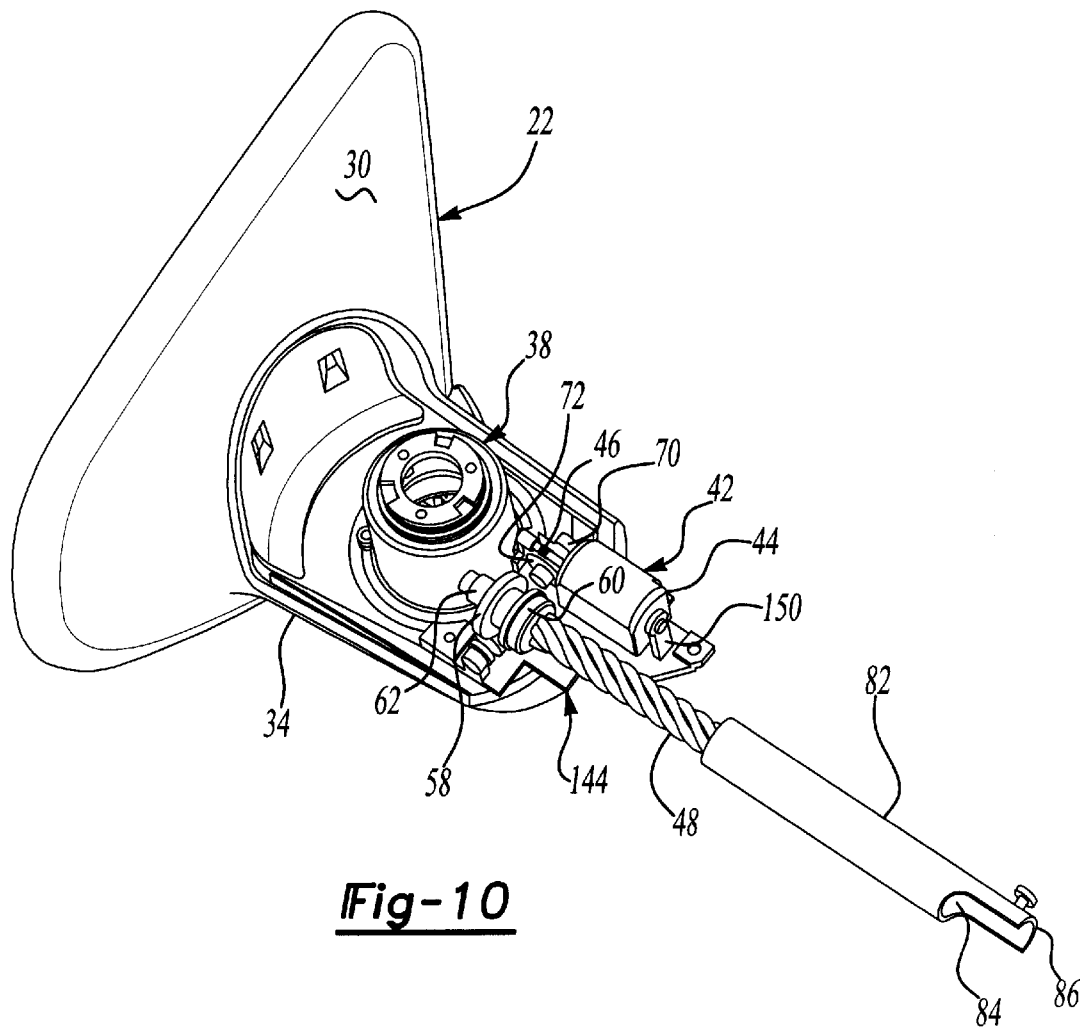
FIG. 10 is a perspective view of the drive mechanism of the mirror assembly in the extended position.

In operation, referring to FIGS. 1 and 9, the mirror assembly 10 is shown in the retracted position and unfolded position. In the retracted position, as shown in FIG. 1, the support arm 24 is fully extended into the support bracket 110 with the tube arm 106 of the housing 20 adjacent to the mounting plate 30 of the support base 22. The extension post portion 138 projects slightly from the tunnel wall 118 of the bracket 110. As shown in FIG. 9, the first end 86 of the tube 82 is seated adjacent the bushing 60 of the drive screw 48. In order to power extend the mirror assembly 10 from the retracted position to the extended position, or any power selected position therebetween, the motor 42 is actuated. The power box 44 rotates the drive shaft and worm gear 46 in either the clockwise or counterclockwise direction. The worm gear 46 is meshed with the disc gear 72 of the intermediate gear assembly 64 to transfer the rotation of the worm gear 46 to rotation of the shaft 66. The shaft 66 simultaneously rotates the worn gear 74. The worm gear 74 is meshed with the drive gear 58 on the end of the drive screw 48 to transfer the rotation of the shaft 66 to simultaneous rotation of the drive gear 58, and hence, the drive screw 48. During power actuation, the spring 94 compresses the drive nut 76 against the retaining ring 92 with sufficient force to interlock the drive nut 76 and tube 82. The tube 82 is fixedly secured to the support bracket 110, which is in turn fixedly secured to the housing 20. Therefore, upon rotation of the drive screw 48 by the motor 42, the drive nut 76 is transferred along the longitudinal length of the drive screw 48 by the meshed engagement between the threads on the drive screw 48 and the threads on the drive nut 76. The housing 20 is, therefore, extended along the support arm 24 to the extended position shown in FIGS. 2 and 10. In order to power retract the mirror assembly 10, the motor 42 is again actuated to rotate the worn gear 46 in the reverse direction. The reverse rotation of the drive screw 48 will again transfer the drive nut 76 along the longitudinal length thereof returning the tube 82, and thus, the housing 20 to the retracted position. It should be appreciated that the power to the motor 42 may be ceased at any time to selectively adjust the housing 20, and mirror assembly 10, to a power selected position at any point along the longitudinal length of the drive screw 48 and support arm 24.

In order to manually actuate the mirror assembly I0 between the retracted position and the extended position, a manual force is simply applied to the housing 20 to slide the housing 20 along the support arm 24. The drive mechanism 40, and particularly the clutch mechanism 80, must therefore also allow the drive nut 76 to freely rotate about the drive screw 48. More specifically, when no power is supplied to the motor 42, the motor 42, worm gear 46 and intermediate gear assembly 64 lock and prevent the drive screw 48 from rotating in either the clockwise or counterclockwise direction. When a force is applied to the housing 20 along the longitudinal direction of the support arm 24, the support bracket 110 pushes or pulls on the tube 82. The drive nut 76 is operatively coupled to the tube 82 by the retaining rings 90, 92 and the spring 94. The drive nut 76 is also coarsely thread to the drive screw 48. With the drive screw 48 locked against rotation, the drive nut 76 is able to overcome the compression force of the spring 94 and rotate about the drive screw 48. The rotation of the drive nut 76 about the drive screw 48 transfers the drive nut 76 longitudinally along the length of the drive screw 48 and allows the housing 20 to slide along the support arm 24 between the retracted position and the extended position. The mirror assembly 10 may also be selectively positioned in a manual selected position by sliding the housing 20 to any point along the longitudinal length of the support arm 24. The retaining member 160 frictionally engages with the support arm 24 to retain the housing 20 in the manual selected position with respect to the support arm 24.

As previously discussed, the mirror assembly 10 may also be pivoted by the pivot mechanism 38 between the unfolded position of FIGS. 1–4 and the rearward or forward folded positions of FIGS. 5 and 6. The mirror assembly 10 may be pivoted by the pivot mechanism 38 through power actuation or manual operation. Additionally, the mirror assembly 10 may be pivoted between the unfolded position and the folded position with the housing 20 either extended or retracted along the support arm 24.

The invention has been described in an illustrative manner, and it is to be understood that the terminology, which has been used, is intended to be in the nature of words of description rather than of limitation.

Obviously, many modification and variations of the present invention are possible in light of the above teachings. It is, therefore, to be understood that within the scope of the appended claims, the invention may be practiced other than as specifically described.

What is claimed is:

1. A mirror assembly for use on an automotive vehicle comprising:

a support member extending longitudinally between a first end adapted to be coupled to the vehicle and an opposite second end;

a housing coupled to said support member and slidable between a retracted position adjacent said first end and an extended position adjacent said second end and spaced from said first end;

a mirror pane operatively Coupled to said housing for providing a reflective view from said mirror assembly; and characterized by a drive mechanism coupled between said support member and said housing for providing both power actuated and manual sliding movement of said housing along said support arm between said retracted position and said extended position.

2. A mirror assembly as set forth in claim 1 further including a pivot mechanism coupled to said support member for providing both power actuated and manual pivoting movement of said support member between an unfolded position extending laterally from the vehicle and at least one folded position pivoted adjacent and generally parallel to the vehicle.

3. A mirror assembly as se t forth in claim 2 wherein said support member includes a support base adapted to Mount said mirror assembly to the vehicle and an elongated support arm extending between a proximal end coupled to said support base and an opposite distal end.

4. A mirror assembly as set forth in claim 3 wherein said pivot mechanism is mounted between said support base and said proximal end of said support arm for pivoting said support arm about said support base between said unfolded position and said folded position.

5. A mirror assembly as set forth in claim 4 wherein said drive mechanism includes a motor coupled to one of said housing and said support member for selectively actuating said drive mechanism to automatically slide said housing along said support arm to a power, selected position between said retracted position and said extended position.

6. A mirror assembly as set forth in claim 5 wherein said drive mechanism includes a clutch mechanism coupled to one of said housing and said support member for selectively actuating said drive mechanism to manually slide said housing along said support arm to a manual selected position between said retracted position and said extended position.

7. A mirror assembly as set forth in claim 6 further including a retaining member coupled between said support arm and said housing for retaining said housing along said support arm in each of said power selected position and said manual selected position.

8. A mirror assembly as set forth in claim 7 wherein said drive mechanism further includes an elongated, cylindrical drive screw having external helical threads, said drive screw extending between a first end operatively coupled to said support arm and a second end operatively coupled to said housing.

9. A mirror assembly as set forth in claim 8 wherein said drive mechanism further includes a drive nut having internal helical threads in mating engagement with said threads of said drive screw for movement therealong between said first end and said second end.

10. A mirror assembly as set forth in claim 9 wherein said drive mechanism further includes at least one drive gear coupled between said drive screw and said motor for rotating said drive screw upon actuation of said motor in both a clockwise and counterclockwise direction.

11. A mirror assembly as set forth in claim 10 wherein said clutch mechanism further includes a spring bias member compressed between said drive nut and said support arm for locking said drive nut upon rotation of said drive screw thereby sliding said housing along said support arm to said power selected position in response to power actuation of said motor and for allowing said drive nut to rotate about said drive screw upon manual sliding adjustment of said housing along said support arm to said manual selected position.

12. A mirror assembly as set forth in claim 11 wherein said drive mechanism includes an elongated tube fixedly secured to said housing and defining a cylindrical bore therethrough for receiving and supporting said drive nut and said spring bias member, said drive screw at least partially received in said bore for threading engagement with said drive nut.

13. A mirror assembly as set forth in claim 12 wherein said drive mechanism further includes a pair of retaining rings fixedly secured within said bore of said tube along opposite sides of said drive nut and said spring bias member for compressing said spring bias member between one of said retaining rings and said drive nut.

14. A mirror assembly as set forth in claim 13 wherein said housing includes an outer wall defining a concave cavity and a peripheral rim defining an opening into said cavity.

15. A mirror assembly as set forth in claim 14 wherein said housing further includes a hollow tube extending from said outer wall for slidably receiving said distal end of said support arm therethrough.

16. A mirror assembly as set forth in claim 15 further including a support plate seated within said cavity and fixedly secured to said outer wall, said support plate spaced from said outer wall and defining a channel therebetween for slidably receiving at least a portion of said distal end of said support arm therethrough.

17. A mirror assembly as set forth in claim 16 further including a power pack fixedly secured to said support plate for mounting said mirror pane to said housing adjacent said opening and for providing pivotal articulation of said mirror pane relative to said housing.

18. A mirror assembly as set forth in claim 17 wherein said support arm includes a pivot base adjacent said proximal end defining a cylindrical cavity for receiving and mounting said pivot mechanism between said support arm and said support base and defining recessed chamber for receiving and supporting said drive gear.

19. A mirror assembly as set forth in claim 18 wherein said support arm includes an extension leg extending from said pivot base to said distal end defining a cylindrical bore therethrough extending from said recessed chamber to said distal end for receiving said drive screw and an extension post extending from said pivot base adjacent and parallel to said extension leg defining a second recessed chamber for receiving and supporting said motor.

20. A mirror assembly as set forth in claim 19 further including a cover plate fixedly secured to said support arm for supporting each of said drive gear and said motor and for closing each of said recessed channel and said recessed chamber.

* * * * *

UNITED STATES PATENT AND TRADEMARK OFFICE
CERTIFICATE OF CORRECTION

PATENT NO. : 6,213,609 B1
DATED : April 10, 2001
INVENTOR(S) : Foote et al.

It is certified that error appears in the above-identified patent and that said Letters Patent is hereby corrected as shown below:

<u>Title page,</u>
Item [57], ABSTRACT,
Line 12, "Support" should be -- support --.
Insert Item -- [63]     Related U.S. Application Data,
            Provisional application No. 60/128,678, filed April 9, 1999 --.

<u>Column 1,</u>
Line 36, "of ten" should be -- often --.
Line 39, "Coupled" should be -- coupled --.
Line 43, "alone" should be -- along --.

<u>Column 2,</u>
Line 38, "is partially" should be -- is a partially --.

<u>Column 4,</u>
Line 10, "56 in connected" should be -- 56 is connected --.
Line 21, "66 and extends" should be -- 66 extends --.
Line 47, "Support" should be -- support --.

<u>Column 5,</u>
Line 47, "nay" should be -- may --.
Line 57, "Support" should be -- support --.

<u>Column 7,</u>
Line 23, "worn" should be -- worm --.

UNITED STATES PATENT AND TRADEMARK OFFICE
CERTIFICATE OF CORRECTION

PATENT NO. : 6,213,609 B1
DATED : April 10, 2001
INVENTOR(S) : Foote et al.

It is certified that error appears in the above-identified patent and that said Letters Patent is hereby corrected as shown below:

Column 8,
Line 23, "Coupled" should be -- coupled --.
Line 39, "Mount" should be -- mount --.

Signed and Sealed this

Sixth Day of September, 2005

JON W. DUDAS
*Director of the United States Patent and Trademark Office*